(12) United States Patent
Hamada et al.

(10) Patent No.: US 11,592,656 B2
(45) Date of Patent: Feb. 28, 2023

(54) IMAGE PROCESSING APPARATUS, IMAGE PROCESSING PROGRAM, AND IMAGE PROCESSING METHOD

(71) Applicant: KRIPTON CO., LTD., Tokyo (JP)

(72) Inventors: Masahisa Hamada, Tokyo (JP); Masato Ogata, Tokyo (JP)

(73) Assignee: KRIPTON CO., LTD.

( * ) Notice: Subject to any disclaimer, the term of this patent is extended or adjusted under 35 U.S.C. 154(b) by 601 days.

(21) Appl. No.: 16/613,661

(22) PCT Filed: May 17, 2018

(86) PCT No.: PCT/JP2018/019085
§ 371 (c)(1),
(2) Date: Nov. 14, 2019

(87) PCT Pub. No.: WO2018/212272
PCT Pub. Date: Nov. 22, 2018

(65) Prior Publication Data
US 2021/0165205 A1      Jun. 3, 2021

(30) Foreign Application Priority Data

May 17, 2017    (JP) .............................. JP2017-098476

(51) Int. Cl.
G02B 21/36    (2006.01)
G02B 21/00    (2006.01)
G06T 7/20    (2017.01)

(52) U.S. Cl.
CPC ....... *G02B 21/367* (2013.01); *G02B 21/0084* (2013.01); *G06T 7/20* (2013.01); *G06T 2207/10056* (2013.01)

(58) Field of Classification Search
None
See application file for complete search history.

(56) References Cited

U.S. PATENT DOCUMENTS

2006/0280249 A1* 12/2006 Poon .................... G06T 5/50
375/240.16
2009/0279821 A1    11/2009 Liu et al.
(Continued)

FOREIGN PATENT DOCUMENTS

JP    2006-350334 A    12/2006
JP    2011234844 A    11/2011
(Continued)

OTHER PUBLICATIONS

Office Action issued in Chinese Patent Application No. 201880021191. 6, dated Dec. 30, 2020, 7 pages.
International Search Report / Written Opinion.

*Primary Examiner* — Eileen M Adams
(74) *Attorney, Agent, or Firm* — Eversheds Sutherland (US) LLP

(57) ABSTRACT

An object of the present invention is to provide an image processing apparatus, an image processing program, and an image processing method capable of specifying and correcting desired motion. An image processing apparatus includes: global motion estimation means for estimating global motion indicating motion of a specific region containing a specific object in a moving picture from a plurality of frame images contained in the moving picture; local motion estimation means for estimating local motion indicating motion of the specific object in the moving picture from the plurality of frame images; and image correction means for correcting the motion of the specific object or the specific region in the moving picture on the basis of the estimated global motion or the local motion.

9 Claims, 16 Drawing Sheets

(56) References Cited

U.S. PATENT DOCUMENTS

| | | | |
|---|---|---|---|
| 2011/0069199 A1 | 3/2011 | Yamazaki | |
| 2012/0231883 A1* | 9/2012 | Hayashi | A63F 13/20 |
| | | | 463/31 |
| 2013/0100303 A1* | 4/2013 | Tsai | G06T 7/246 |
| | | | 348/208.1 |
| 2015/0029306 A1* | 1/2015 | Cho | G06T 7/246 |
| | | | 348/38 |
| 2016/0246045 A1* | 8/2016 | Watanabe | G02B 21/0084 |
| 2018/0091818 A1* | 3/2018 | Persson | H04N 19/137 |

FOREIGN PATENT DOCUMENTS

| | | |
|---|---|---|
| JP | 2013017155 A | 1/2013 |
| JP | 2015-080471 A | 4/2015 |

* cited by examiner

Fig. 4
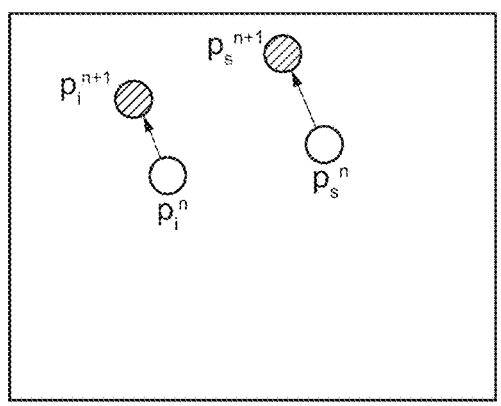 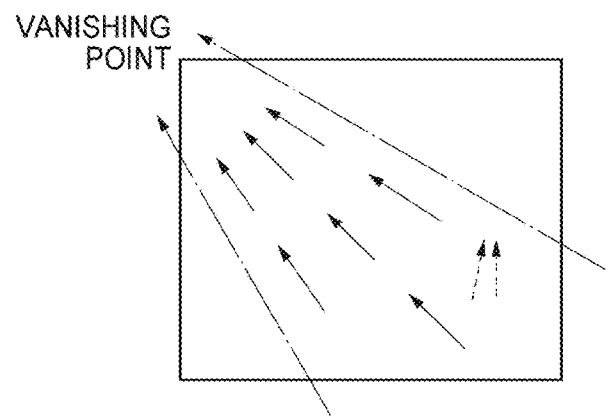
(a) IMAGE MOTION DUE TO CAMERA          (b) GLOBAL/LOCAL MOTION

Fig. 6

| | | | | POINT SEQUENCE IN IMAGE OF n-1-TH FRAME |
|---|---|---|---|---|
| $(x_1^{n-1}, y_1^{n-1})$ | $(x_2^{n-1}, y_2^{n-1})$ | ... | $(x_M^{n-1}, y_M^{n-1})$ | |
| $(x_1^n, y_1^n)$ | $(x_2^n, y_2^n)$ | ... | $(x_M^n, y_M^n)$ | POINT SEQUENCE IN IMAGE OF n-TH FRAME |

DURING DETECTION OF M POINTS →

Fig. 8
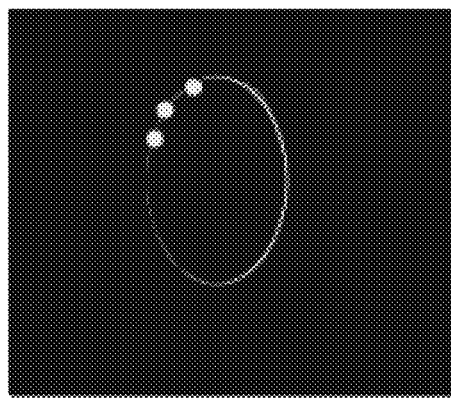 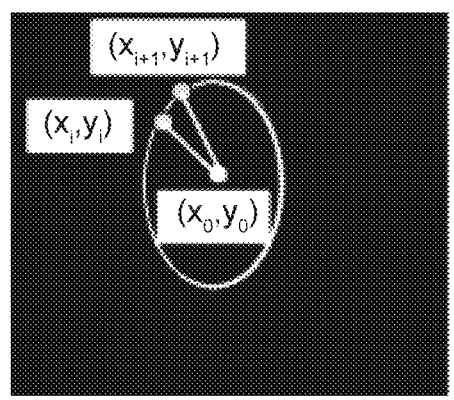
(a) CONTOUR OF SPECIFIC OBJECT    (b) CENTROID POINT OF SPECIFIC OBJECT

IMAGE PROCESSING APPARATUS, IMAGE PROCESSING PROGRAM, AND IMAGE PROCESSING METHOD

TECHNICAL FIELD

The present invention relates to an image processing apparatus, an image processing program, and an image processing method.

BACKGROUND ART

Generally, it has been known that global motion indicating the motion of a specific region of an image (or an entire image) due to the motion of a camera or the like and local motion indicating the motion of a specific object exist in a moving picture.

Conventionally, processing for taking an average, a median, and a mode of a motion vector obtained for each block has been used as a simple method to estimate global motion. Further, an image processing apparatus that estimates the motion vector of an entire image while regarding the entire image as one large block is known.

The following Patent Literature 1 discloses a method for performing distortion correction based on video processing. However, the method uses image feature points and discloses a technical idea for separately estimating both a parallel movement component and a distortion component which are caused by the fluctuation of video.

CITATION LIST

Patent Document

Patent Document 1: Patent Publication JP-A-2013-017155

SUMMARY

Technical Problem

However, with the above conventional technology, the problem has arisen that desired motion among global motion and local motion cannot be specified and corrected.

The present invention has been made in view of the above circumstances and has an object of providing an image processing apparatus, an image processing program, and an image processing method capable of specifying and correcting desired motion.

Solution to Problem

An image processing apparatus according to an aspect of the present invention includes: global motion estimation means for estimating global motion indicating motion of a specific region (or an entire image) containing a specific object in a moving picture from a plurality of frame images contained in the moving picture; local motion estimation means for estimating local motion indicating motion of the specific object in the moving picture from the plurality of frame images; and image correction means for correcting the motion of the specific object or the specific region in the moving picture on the basis of the estimated global motion or the local motion.

Further, an image processing program according to an aspect of the present invention includes the steps of: performing global motion estimation for estimating global motion indicating motion of a specific region (or an entire image) containing a specific object in a moving picture from a plurality of frame images contained in the moving picture; performing local motion estimation for estimating local motion indicating motion of the specific object in the moving picture from the plurality of frame images; and performing image correction for correcting the motion of the specific object or the specific region in the moving picture on the basis of the estimated global motion or the local motion.

An image processing method according to an aspect of the present invention includes the steps of: performing global motion estimation for estimating global motion indicating motion of a specific region (or an entire image) containing a specific object in a moving picture from a plurality of frame images contained in the moving picture; performing local motion estimation for estimating local motion indicating motion of the specific object in the moving picture from the plurality of frame images; and performing image correction for correcting the motion of the specific object or the specific region in the moving picture on the basis of the estimated global motion or the local motion.

Advantageous Effects of Invention

According to the present invention, it becomes possible to perform desired image processing by correcting specified motion.

BRIEF DESCRIPTION OF DRAWINGS

FIG. 4 is an outline diagrams of two-dimensional image motion due to three-dimensional motion in a space.

FIG. 6 is an outline diagram of a corresponding point sequence memory.

FIG. 8 is an outline diagram of the extraction of the contour and the centroid point of a specific object.

DESCRIPTION OF EMBODIMENTS

Hereinafter, embodiments of the present invention will be described with reference to the drawings.

Figure 1:
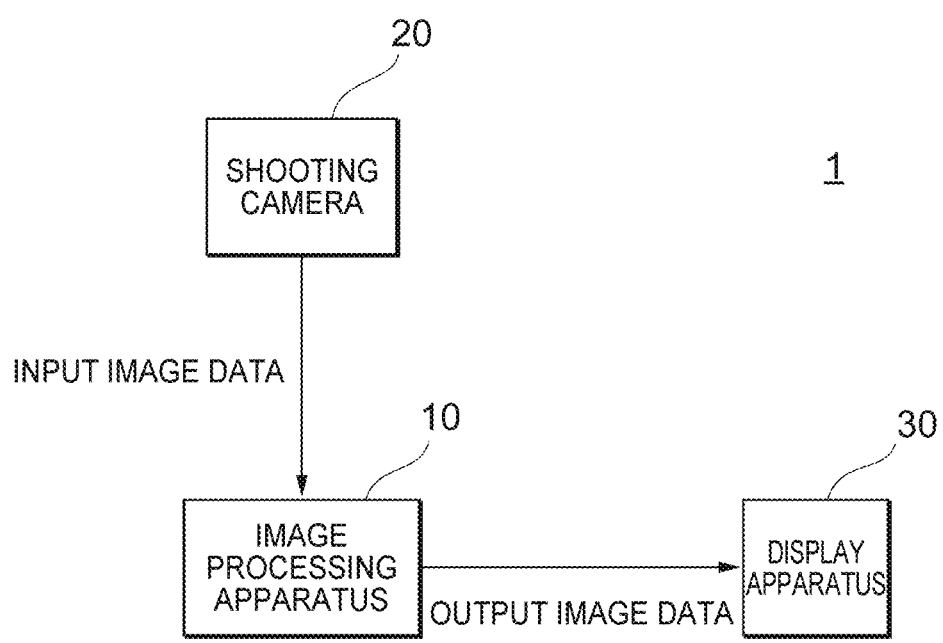
FIG. 1 is a schematic diagram of an image processing system 1 according to an embodiment of the present invention.

FIG. 1 is a schematic diagram of an image processing system 1 according to an embodiment of the present invention. The image processing system 1 includes an image processing apparatus 10, a shooting camera 20, and a display apparatus 30. The shooting camera 20 generates input image data indicating an image obtained by shooting a prescribed shot target and transmits the generated input image data to the image processing apparatus 10. The image processing apparatus 10 performs prescribed processing on the input image data received from the shooting camera 20 and transmits output image data to the display apparatus 30. The display apparatus 30 displays a prescribed image on the basis of the output image data received from the image processing apparatus 10.

Figure 2:
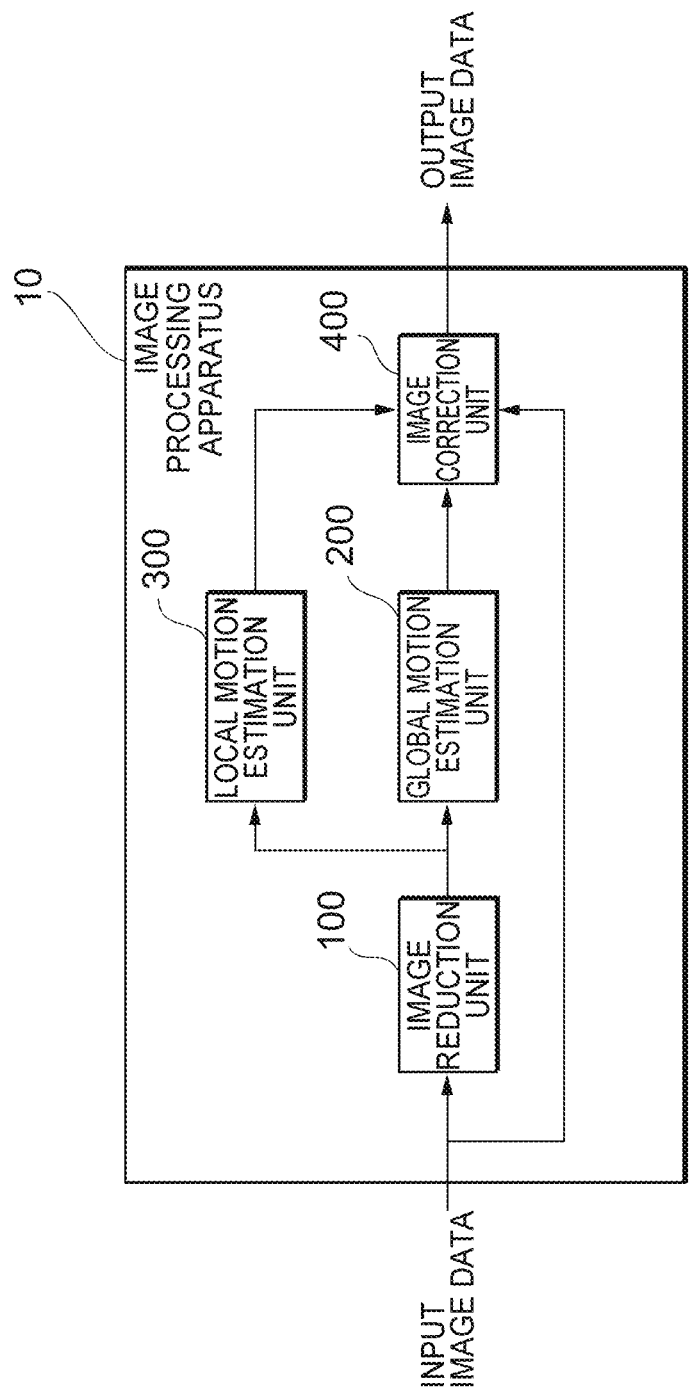
FIG. 2 is a conceptual diagram of an image processing apparatus 10 according to an embodiment of the present invention.

FIG. 2 is a conceptual diagram of the image processing apparatus 10 according to an embodiment of the present invention. The image processing apparatus 10 includes an image reduction unit 100, a global motion estimation unit 200, a local motion estimation unit 300, and an image correction unit 400.

The image reduction unit 100 aims to reduce input image data to desired processing image data to accelerate subsequent global motion estimation processing and local motion estimation processing. Image processing based on image data having high resolution will result in a difficulty in performing processing within a processing time corresponding to a prescribed video rate. Therefore, the input image data is not directly used but is separated and reduced to a prescribed size as image data for calculation processing to calculate a projective transformation matrix or the like, whereby the efficiency of processing can be increased. Besides a reduction in its image size, the input image data may be transformed to a prescribed image format. Note that the input image data itself is used as an image to be corrected by the image correction unit 400 as will be described later.

The global motion estimation unit 200 estimates global motion on the basis of the image data of a target frame and (the image data of, for example, the previous frame), the frame previous to the target frame. The details of respective configurations included in the global motion estimation unit 200 will be described later.

The local motion estimation unit 300 estimates local motion on the basis of the image data of a target frame and (the image data of, for example, the previous frame), the frame previous to the target frame. The details of respective configurations included in the local motion estimation unit 300 will be described later. Note that the function of the local motion estimation unit 300 may be disabled when the compensation of local motion is not required.

The image correction unit 400 generates a projective transformation matrix on the basis of estimated global motion and local motion and corrects the motion of a specific object or a specific region (or an entire image) in a moving picture. The details of respective configurations included in the image correction unit 400 will be described later.

Prior to the description of the outline of image processing by the image processing apparatus 10, motion in a moving picture will be first described below.

Figure 3:
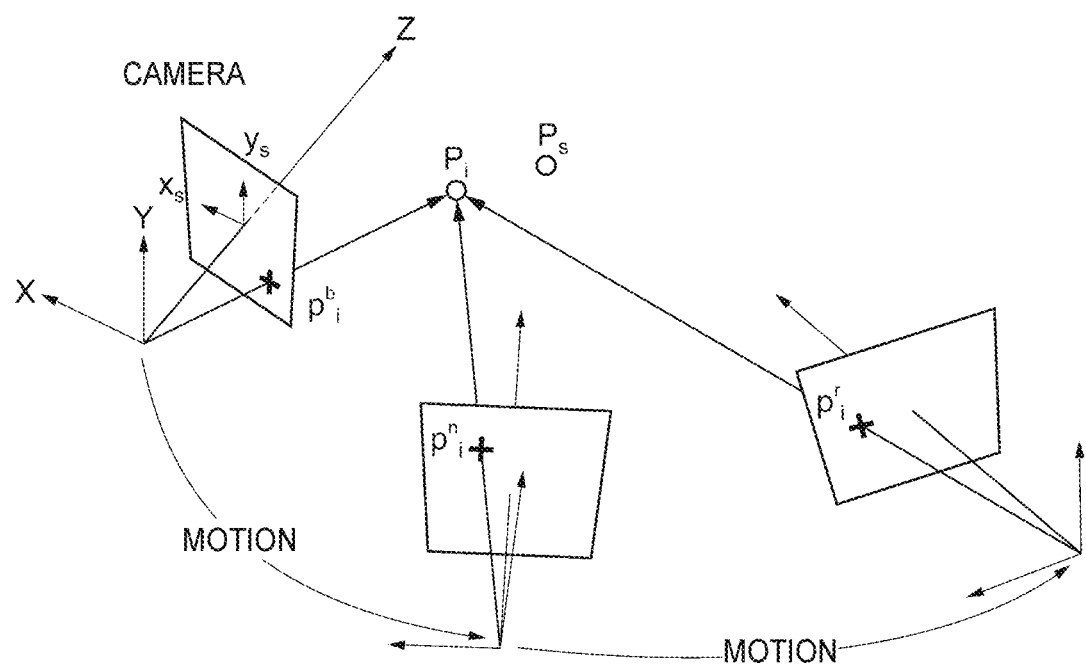
FIG. 3 is a diagram of the corresponding relationships between a point on a space and pixel points in images corresponding to camera motion.

FIG. 3 shows the relationships between a point $P_i$ on a three-dimensional space and a pixel point $p_i^b$ of an image at a corresponding camera position b (or a camera position in the b-th frame), a pixel point $p_i^n$ of an image at a corresponding camera position n (or a camera position in the n-th frame), and a pixel point $p_i^r$ of an image at a corresponding camera position r (or a camera position in the r-th frame). Here, i indicates a pixel point number.

The relationship between the point $P_i$ on the space and the point $p_i^n$ on a screen is described by a vector formula using homogeneous coordinates as follows.

[Math. 1]

$$\vec{p}_i^{\,n} = M_I M_E \vec{P}_i \qquad (1)$$

However, $M_I$ and $M_E$ indicate the internal parameter and the external parameter of a camera, respectively. The internal parameter is information depending on a camera lens system, and the external parameter is information indicating the position and the shooting direction of the camera in the space. Formula (1) is developed into elements as follows.

[Math. 2]

$$\begin{bmatrix} \lambda_i^n x_i^n \\ \lambda_i^n y_i^n \\ \lambda_i^n \end{bmatrix} = \begin{bmatrix} f_x & 0 & c_x \\ 0 & f_y & c_y \\ 0 & 0 & 1 \end{bmatrix} [R^n | t^n] \begin{bmatrix} X_i \\ Y_i \\ Z_i \\ 1 \end{bmatrix} \qquad (2)$$

However, $X_i$, $Y_i$, and $Z_i$ indicate the three-dimensional coordinates of the specific point of an object, and $x_i^n$ and $y_i^n$ indicate pixel points corresponding to the specific point of the object at the camera position n. Further, $f_x$ and $f_y$ indicate focal distances, $c_x$ and $c_y$ indicate the deviation of a light axis from a center, and $R^n$ and $t^n$ indicate rotation and translation to a camera coordinate system at the camera position number n, respectively. Further, a pixel position is multiplied in advance by $\lambda_i^n$ times that is scale information so as to be normalized as $(x_i^n, y_i^n, 1)$.

Formula (3) is obtained when the internal parameter and the external parameter are summarized in a projective transformation matrix $H^n$.

[Math. 3]

$$\vec{p}_i^{\,n} = H^n \vec{P}_i \qquad (3)$$

As for the camera position r as well, Formulae (4) and (5) are obtained in the same manner as the above.

[Math. 4]

$$\begin{bmatrix} \lambda_i^r x_i^r \\ \lambda_i^r y_i^r \\ \lambda_i^r \end{bmatrix} = \begin{bmatrix} f_x & 0 & c_x \\ 0 & f_y & c_y \\ 0 & 0 & 1 \end{bmatrix} [R^r | t^r] \begin{bmatrix} X_i \\ Y_i \\ Z_i \\ 1 \end{bmatrix} \qquad (4)$$

[Math. 5]

$$\vec{p}_i^{\,r} = H^r \vec{P}_i \qquad (5)$$

$H^n$ is a matrix of three rows and four columns, and the general inverse matrix $(H^n)^-$ of the matrix is shown in Formula (6). Note that the general inverse matrix $(H^n)^-$ is a matrix of four rows and three columns.

[Math. 6]

$$(H^n)^- = (H^n)^T \cdot (H^n \cdot (H^n)^T)^{-1} \qquad (6)$$

Thus, the corresponding relationship between a pixel point at the camera position n and a pixel point at the camera position r can be expressed by Formula (7).

[Math. 7]

$$p_i^{-r} = (H^r \cdot (H^n)^-) p_i^{-n} \qquad (7)$$

When Formula (7) is transformed with the assumption that a projective transformation matrix that transforms the pixel position of the image at the camera position n to the corresponding pixel position of the image at the camera position r after motion is $H^{n2r}$, Formula (8) below is obtained.

[Math. 8]

$$p_i^{-r} = H^{n2r} p_i^{-n} \qquad (8)$$

Note that when cameras used at the camera positions r and n are the same cameras, the internal parameter $M_I$ is cancelled out and not included in the projective transformation matrix $H^{n2r}$.

Next, the motion of an image (the motion of an object in the image) will be described. A substance having a contour in a three-dimensional space has a contour as a two-dimensional object in a two-dimensionally projected image as well. A change in position occupied on the image for each frame by these two-dimensional objects in the image is called the motion of the image (exactly, the motion of the objects in the image). The motion of the image can be classified as in Table 1 according to its occurrence factors. Note that a "motion frequency" indicates the spatial frequency of a motion track in a narrow sense.

TABLE 1

| Motion Factor | Image Motion Type | Example | Feature |
|---|---|---|---|
| Camera Motion | Global | Intended Motion (Pan, Tilt, etc.) | Motion frequency is low. |
| | | Unintended Motion (Camera Shake, Vibration, etc.) | Motion frequency is high. |
| Individual Motion of Object | Local | Motion of Operator's Hand Deformation of Internal Organ Motion of Microorganism | Motion frequency is individual. |

First, global motion indicating the motion of a specific region of an image (or an entire image) due to the motion or a camera or the like exists. In the motion of an image caused by the motion of a camera, all objects uniformly move in the same direction (vanishing point). The motion of the camera causing the global motion is classified into intended motion such as pan and tilt to select the direction of the camera and unintended motion such as vibration. On the other hand, the individual motion of an object in a space is local motion in which only a specific portion of an image moves. Normally, motion in an image is a combination of the global motion and the local motion.

FIG. 4 shows two-dimensional image motion due to three-dimensional motion in a space using the motion of corresponding pixels. FIG. 4(a) is a schematic diagram showing the global motion of an image due to the motion of a camera or the like. It is shown that pixel points $p_i^n$ and $p_s^n$ corresponding to specific pixels i and s at a certain time (for example, the n-th frame) have moved to corresponding pixel positions $p_i^{n+1}$ and $p_s^{n+1}$ at a next certain time, respectively. The motion is indicated by the movement amount vectors of arrows.

FIG. 4(b) shows movement amount vectors with respect to more pixel points. The feature of the global motion is that vector directions are uniformly projectively transformed and oriented in a vanishing point direction. Further, FIG. 4(b) shows a state in which the autonomous motion of an object in a space and the motion of a camera have occurred at the same time. That is, local motion exists at a partial specific image portion, besides the global motion. In the figure, arrows indicated by broken lines oriented in a direction different from the vanishing point direction are the movement amount vectors of the local motion.

Next, the outline of the image processing by the image processing apparatus 10 will be described.

The image reduction unit 100 obtains image data obtained by reducing input image data to a desired size.

The estimation of global motion by the global motion estimation unit 200 will be described below.

Figure 5:
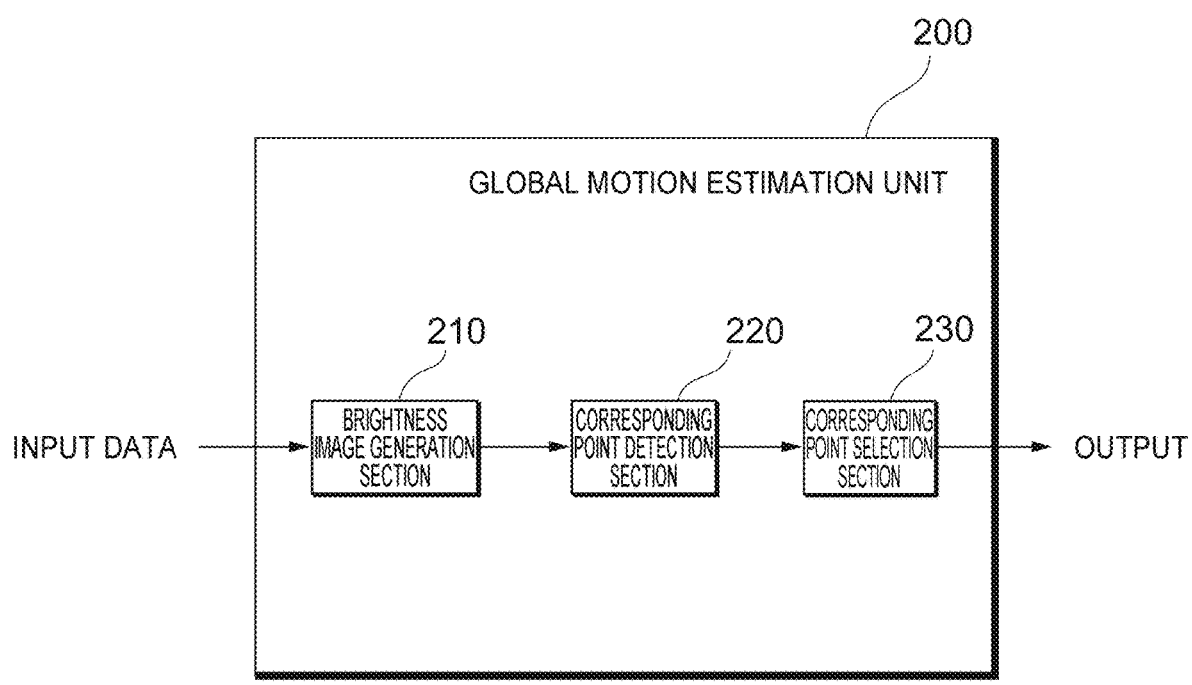
FIG. 5 is a conceptual diagram of a global motion estimation unit 200 according to an embodiment of the present invention.

FIG. 5 shows a configuration example of the global motion estimation unit 200. The global motion estimation unit 200 includes, for example, a brightness image generation section 210, a corresponding point detection section 220, and a corresponding point selection section 230.

The brightness image generation section 210 transforms input image data (or an image reduced in size) to a gray scale image (a monochrome brightness image of, for example, eight bits).

The corresponding point detection section 220 detects how corresponding points have moved in the image data of two frames (for example, the image data of a target frame and the image data of the previous frame). The specification of the corresponding points can be performed in an appropriate way but is performed by, for example, recognizing points that are similar in the brightness of a noticeable image and the gradient of surrounding brightness as the corresponding points. The corresponding point detection section outputs information on the detected corresponding points as corresponding point sequence memory information. FIG. 6 shows the outline of a corresponding point sequence memory.

Figure 7:
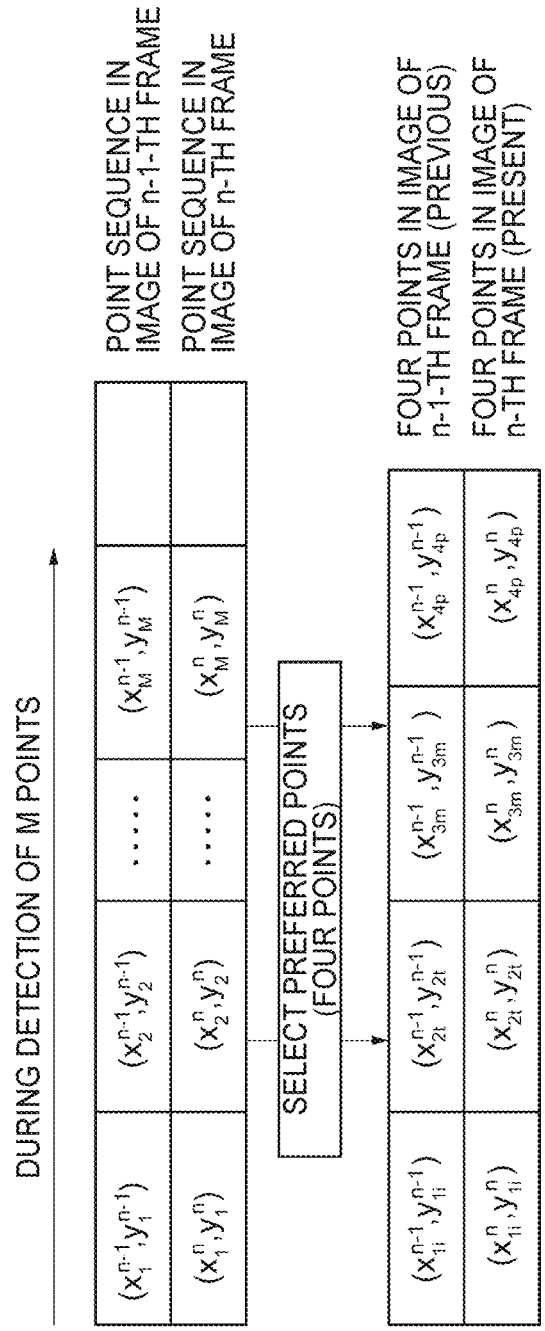
FIG. 7 is an outline diagram of processing by a corresponding point selection section 230 according to an embodiment of the present invention.

The corresponding point selection section 230 selects an appropriate corresponding point from among the corresponding points detected by the corresponding point detection section 220. As will be described later, four or more corresponding points are required to solve a projective transformation matrix. FIG. 7 shows the outline of processing by the corresponding point selection section 230. Information on the selected corresponding points is output to the image correction unit 400.

The estimation of local motion by the local motion estimation unit 300 will be described below. Note that the estimation of local motion can be performed in an appropriate way. However, the estimation of local motion based on a movement amount of the centroid of a specific object will be described below. FIG. 8 shows the outline of the extraction of the contour and the centroid point of a specific object.

Figure 9:
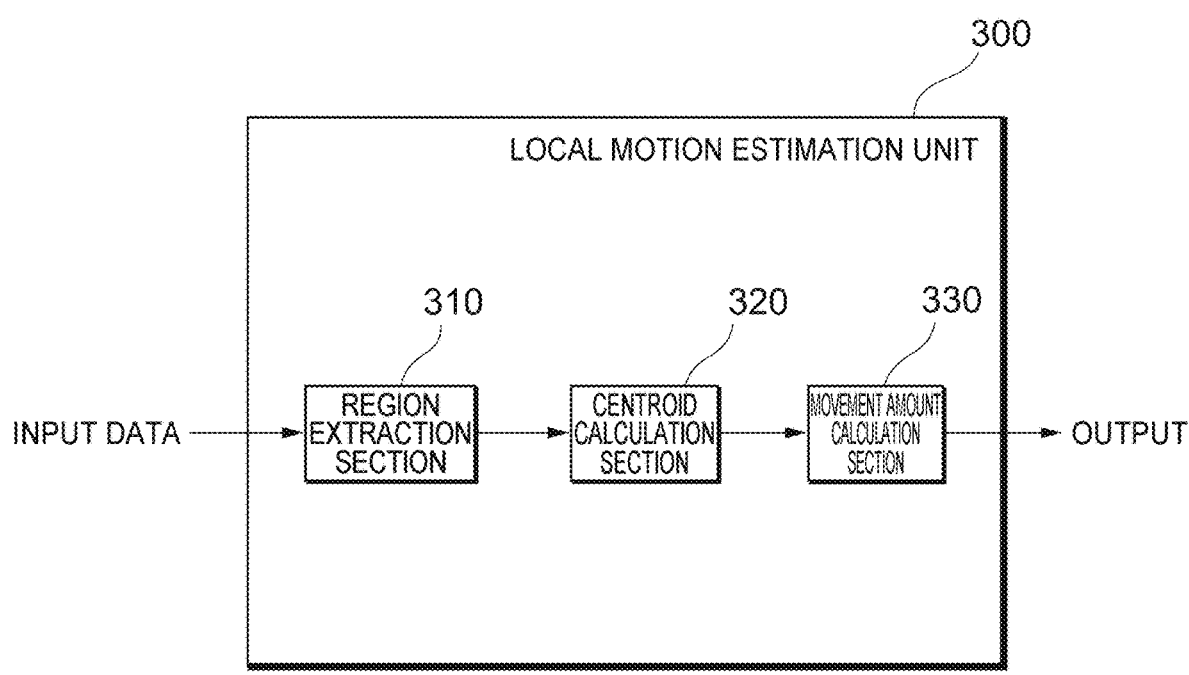
FIG. 9 is a conceptual diagram of a local motion estimation unit 300 according to an embodiment of the present invention.

FIG. 9 shows a configuration example of the local motion estimation unit 300. The local motion estimation unit 300 includes a region extraction section 310, a centroid calculation section 320, and a movement amount calculation section 330.

The region extraction section 310 extracts a region occupied by a specific object that performs local motion. The extraction of the region can be performed in an appropriate way but is performed by, for example, extracting a region having a specific hue.

The centroid calculation section 320 generates the coordinates $((x_1^n, y_1^n), \ldots, (x_i^n, y_i^n), \ldots, (x_N^n, y_N^n))$ of point sequences constituting a contour line in an appropriate way with respect to the region extracted by the region extraction section 310 and calculates the centroid position of the specific object according to Formula (9) below. Note that the centroid position may be processed as a binarized image.

[Math. 9]

$$x_0^n = \frac{1}{N} \sum_{i=1}^{N} x_i^n \quad (9)$$

$$y_0^n = \frac{1}{N} \sum_{i=1}^{N} y_i^n$$

Movement amount vectors with respect to the previous frame are calculated by Formula (10) below. The values of the movement amount vectors are output to the image correction unit 400.

[Math. 10]

$$x_0^{(n-1)2n} = x_0^n - x_0^{n-1}$$

$$y_0^{(n-1)2n} = y_0^n - y_0^{n-1} \quad (10)$$

Next, the correction of an image by the image correction unit 400 will be described.

Figure 10:
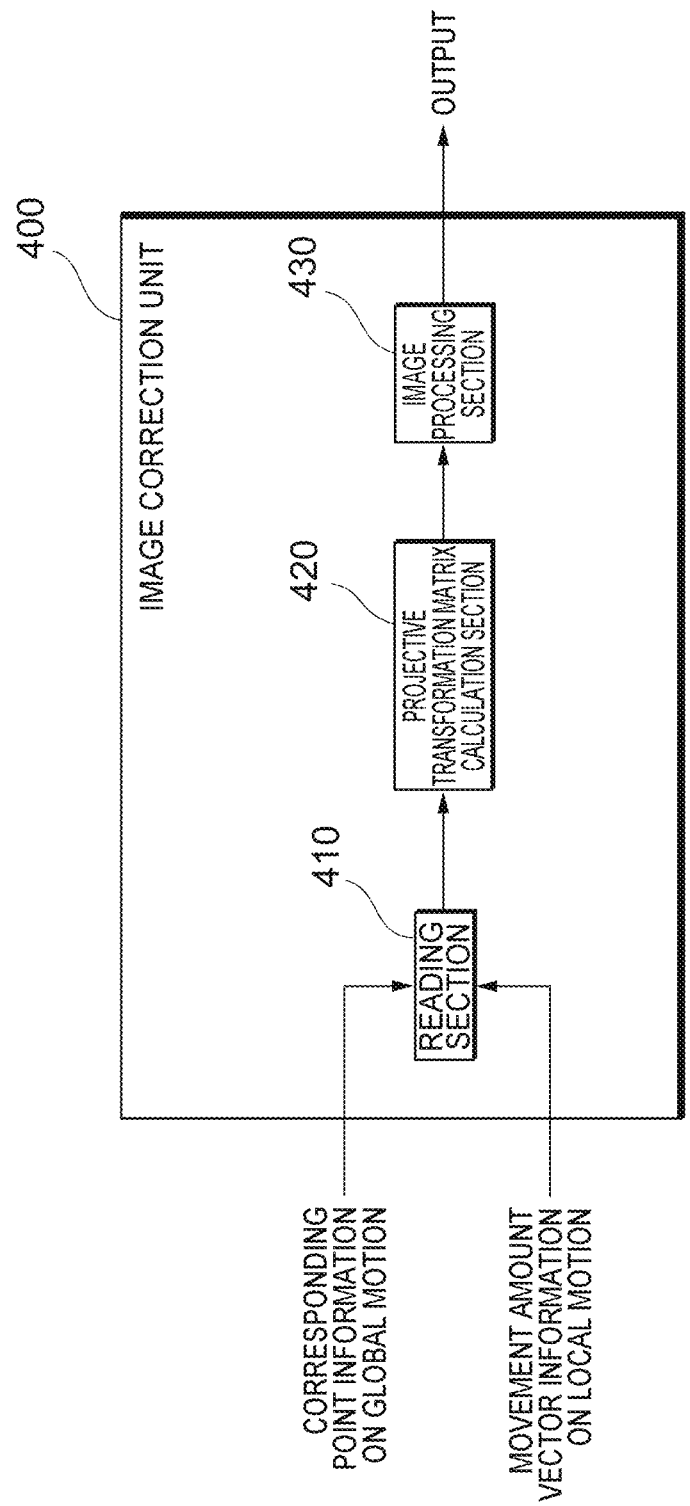
FIG. 10 is a conceptual diagram of an image correction unit 400 according to an embodiment of the present invention.

FIG. 10 shows a configuration example of the image correction unit 400. The image correction unit 400 includes a reading section 410, a projective transformation matrix calculation section 420, and an image processing section 430.

The reading section 410 reads corresponding point information on global motion and movement amount vector information on local motion and transmits the read information to the projective transformation matrix calculation section 420.

The projective transformation matrix calculation section 420 first generates a projective transformation matrix associated with the global motion on the basis of the corresponding point information on the global motion. As described above, the projective transformation matrix that transforms the pixel position of an image at a camera position n (that is, the n-th frame) to the corresponding pixel position of an image at a camera position r (that is, the r-th frame) after motion is shown in Formula (8).

$H^{n2r}$ is a matrix of three rows and three columns and thus has nine unknown quantities at most. Since $p_i^{-n}$ and $p_i^{-r}$ are known, the unknown $H^{n2r}$ can be calculated if a simultaneous equation is solved using a plurality of paired corresponding point sequences. The projective transformation matrix is a relational expression using a simultaneous coordinate system and its scale is not fixed since the projective transformation matrix is a matrix of three rows and three columns. Therefore, the freedom degree of the projective transformation matrix becomes eight. Accordingly, $H^{n2r}$ can be expressed as follows, and unknown quantities in a matrix format become eight elements.

[Math. 11]

$$H^{n2r} = \begin{bmatrix} h_{11} & h_{12} & h_{13} \\ h_{21} & h_{22} & h_{23} \\ h_{31} & h_{32} & 1 \end{bmatrix} \quad (11)$$

$H^{n2r}$ can be solved if there are four or more tracking points. A case in which there are four tracking points will be described below. First, the positional relationships between the n-th frame and the r-th frame of the respective tracking points can be indicated as follows.

[Math. 12]

$$p_1^{-r} = H^{n2r} p_1^{-n}$$

$$p_2^{-r} = H^{n2r} p_2^{-n}$$

$$p_3^{-r} = H^{n2r} p_3^{-n}$$

$$p_4^{-r} = H^{n2r} p_4^{-n} \quad (12)$$

Formula (12) is rewritten by elements as follows.

[Math. 13]

$$\begin{bmatrix} \lambda_i^r x_i^r \\ \lambda_i^r y_i^r \\ \lambda_i^r \\ \lambda_2^r x_2^r \\ \lambda_2^r y_2^r \\ \lambda_2^r \\ \lambda_3^r x_3^r \\ \lambda_3^r y_3^r \\ \lambda_3^r \\ \lambda_4^r x_4^r \\ \lambda_4^r y_4^r \\ \lambda_4^r \end{bmatrix} = \begin{bmatrix} H & 0 & 0 & 0 \\ 0 & H & 0 & 0 \\ 0 & 0 & H & 0 \\ 0 & 0 & 0 & H \end{bmatrix} \begin{bmatrix} x_i^n \\ y_i^n \\ 1 \\ x_2^n \\ y_2^n \\ 1 \\ x_3^n \\ y_3^n \\ 1 \\ x_4^n \\ y_4^n \\ 1 \end{bmatrix} \quad (13)$$

Formula (13) is summarized in a general simultaneous equation as follows.

[Math. 14]

$$\begin{bmatrix} x_i^n & y_i^n & 1 & 0 & 0 & 0 & -x_i^n x_i^r & -y_i^n x_i^r \\ 0 & 0 & 0 & x_i^n & y_i^n & 1 & -x_i^n y_i^r & -y_i^n y_i^r \\ x_2^n & y_2^n & 1 & 0 & 0 & 0 & -x_2^n x_2^r & -y_2^n x_2^r \\ 0 & 0 & 0 & x_2^n & y_2^n & 1 & -x_2^n y_2^r & -y_2^n y_2^r \\ x_3^n & y_3^n & 1 & 0 & 0 & 0 & -x_3^n x_3^r & -y_3^n x_3^r \\ 0 & 0 & 0 & x_3^n & y_3^n & 1 & -x_3^n y_3^r & -y_3^n y_3^r \\ x_4^n & y_4^n & 1 & 0 & 0 & 0 & -x_4^n x_4^r & -y_4^n x_4^r \\ 0 & 0 & 0 & x_4^n & y_4^n & 1 & -x_4^n y_4^r & -y_4^n y_4^r \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x_i^r \\ y_i^r \\ x_2^r \\ y_2^r \\ x_3^r \\ y_3^r \\ x_4^r \\ y_4^r \end{bmatrix} \quad (14)$$

The unknown respective elements of $H^{n2r}$ can be calculated by solving the equation shown in Formula (14).

Next, the projective transformation matrix calculation section 420 corrects $H^{n2r}$ as follows on the basis of the movement amount vector values received from the local motion estimation unit 300. Here, Width indicates the number of pixels in the lateral direction of the image, and Height indicates the number of pixels in the vertical direction of the image.

[Math. 15]

$$H^{n2r} = \begin{bmatrix} h_{11} & h_{12} & h_{13} \\ h_{21} & h_{22} & h_{23} \\ h_{31} & h_{32} & 1 \end{bmatrix} \Leftarrow \begin{bmatrix} h_{11} & h_{12} & h_{13} - \frac{2x_0^{n2r}}{\text{Width}} \\ h_{21} & h_{22} & h_{23} - \frac{2y_0^{n2r}}{\text{Height}} \\ h_{31} & h_{32} & 1 \end{bmatrix} \quad (15)$$

As described below, the projective transformation matrix calculation section calculates a projective transformation matrix $H^{b2r}$ from the b-th frame to the r-th frame from the projective transformation matrix $H^{n2r}$ from the n-th frame to the r-th frame and a projective transformation matrix $H^{b2n}$ from the b-th frame to the n-th frame.

[Math. 16]

$$H^{b2r} = H^{n2r} \cdot H^{b2n} \quad (16)$$

The projective transformation matrix $H^{b2r}$ may be cumulatively calculated for each frame. That is, if n and r are replaced with (n−1) and n, respectively, in Formula (16), the projective transformation matrix $H^{b2n}$ from the b-th frame to the n-th frame can be calculated from a projective transformation matrix $H^{(n-1)2n}$ from the b−1-th frame to the n-th frame and a projective transformation matrix $H^{b2(n-1)}$ from the b-th frame to the n−1-th frame. Similarly, the projective transformation matrix $H^{b2(n-1)}$ from the b-th frame to the n−1-th frame can be calculated from a projective transformation matrix $H^{(n-2)2(n-1)}$ from the n−2-th frame to the n−1-th frame and a projective transformation matrix $H^{b2(n-2)}$ from the b-th frame to the n−2-th frame. In this manner, the projective transformation matrix calculation section 420 can cumulatively generate a projective transformation matrix by cumulatively multiplying a projective transformation matrix from the previous frame for each frame from the b-th frame.

Figure 11:
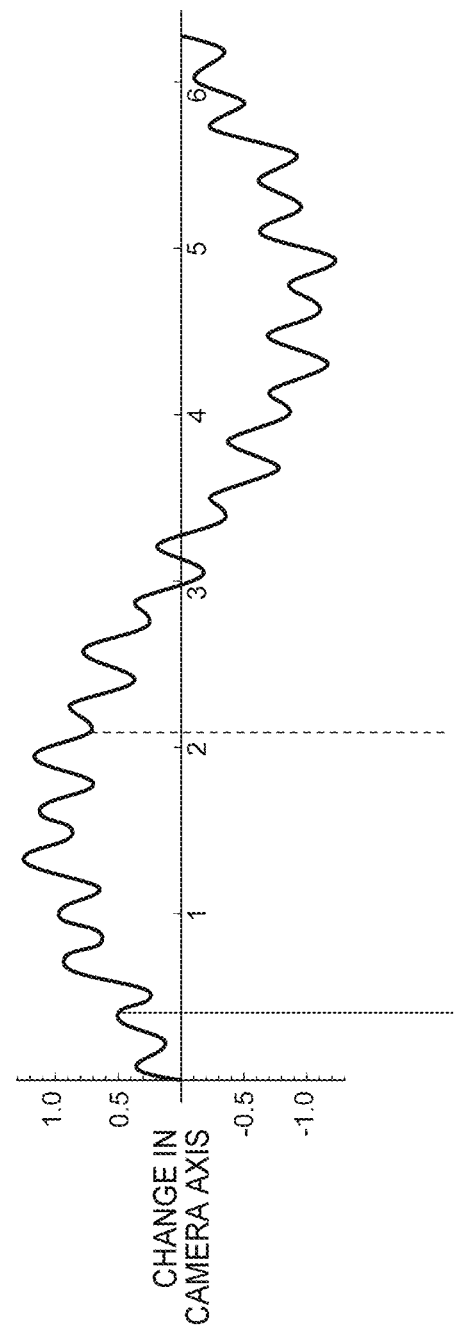
FIG. 11 is a schematic diagram of a change in camera axis due to camera motion.

Note that the projective transformation matrix calculation section may set a reference image cycle at which a frame serving as a reference is updated for each prescribed cycle. By the setting of the reference image cycle, it becomes possible to distinctively detect intended global motion that has a low motion frequency and unintended global motion that has a high motion frequency. FIG. 11 shows a schematic diagram of a change in camera axis due to camera motion. The short-cycle waveform of unintended global motion such as camera shake or vibration is superimposed on the long-cycle waveform of intended global motion such as pan and tilt of a camera. By the setting of a short reference image cycle, the compensation of intended global motion can be prevented.

The image processing section 430 makes compensation for the input image data of the n-th frame as follows using the (cumulative) projective transformation matrix $H^{b2n}$ from the b-th frame to the n-th frame. However, the pixel of the input image data is $p_i^r$, and a pixel after transformation is $p_i^{b'}$. Note that the input image data used in the compensation here is not image data reduced in size, but the input image data of an original size can be used.

[Math. 17]

$$p_i^{b'} = (H^{b2r})^{-1} \cdot p_i^r \quad (17)$$

The illustrative embodiments of the image processing apparatus 10 have been described so far. In the basic embodiment, the image processing apparatus 10 includes: the global motion estimation unit 200 that estimates global motion indicating the motion of a specific region containing a specific object in a moving picture from a plurality of frame images contained in the moving picture; the local motion estimation unit 300 that estimates local motion indicating the motion of the specific object in the moving picture from the plurality of frame images; and the image correction unit 400 that corrects the motion of the specific object or the specific region in the moving picture on the basis of the estimated global motion or the local motion. Thus, an image can be corrected with the specification of desired motion.

The local motion estimation unit 300 may estimate local motion using a movement amount of a specific point in a region containing the specific object. Further, the specific point used by the local motion estimation unit 300 may be the centroid of the object. Thus, an image in which the centroid point of a specific object stops and another portion relatively moves can be generated.

The image correction unit 400 may generate a projective transformation matrix corresponding to the estimated global motion, correct the projective transformation matrix on the basis of the estimated local motion, and correct the motion of the specific object or the specific region in the moving picture on the basis of the corrected projective transformation matrix. Thus, global motion and local motion can be compensated at the same time.

The global motion estimation unit 200 and the local motion estimation unit 300 may estimate global motion and local motion using an image obtained by reducing an input image. Thus, the efficiency of processing for calculating a projective transformation matrix can be increased.

Figure 12:
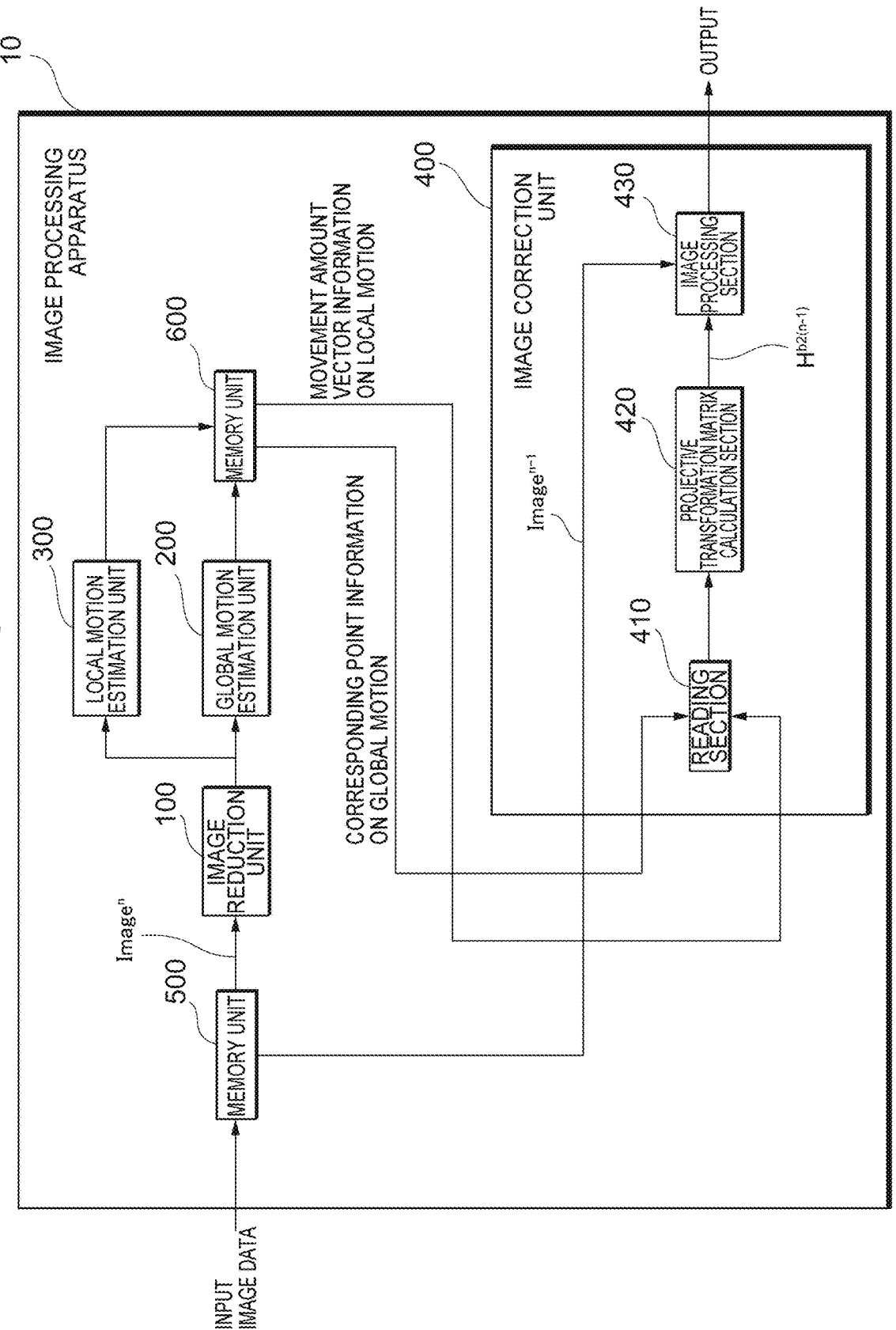
FIG. 12 is a conceptual diagram of the image processing apparatus 10 enabling parallel processing.

The image processing apparatus 10 may perform parallel processing. FIG. 12 shows an example. A memory unit 500 retains, for example, the input image data Image$^n$ of the n-th frame and the input image data Image$^{n-1}$ of the n−1-th frame previous to the n-th frame as input image data. The memory unit 500 outputs Image$^n$ to the global motion estimation unit 200 and the local motion estimation unit 300. The global motion estimation unit 200 and the local motion estimation unit 300 perform prescribed estimation processing on the input image data Image$^n$ of the n-th frame and output corresponding point information on global motion and movement amount vector information on local motion associated with the input image data Image$^n$ of the n-th frame to a memory unit 600, respectively. Note that the memory unit 600 retains corresponding point information on global motion and movement amount vector information on local motion associated with the input image data Image$^{n-1}$ of the n−1-th frame previous to the n-th frame as well.

In parallel with the above processing, the image correction unit 400 performs image correction on the input image data Image$^{n-1}$ of the n−1-th frame. Specifically, the reading section 410 reads corresponding point information on the global motion and movement amount vector information on the local motion associated with the input image data Image$^{n-1}$ of the n−1-th frame retained by the memory unit 600 and outputs the read information to the projective transformation matrix calculation section 420. The projective transformation matrix calculation section 420 calculates a projective transformation matrix $H^{b2(n-1)}$ from the b-th frame to the n−1-th frame and outputs the calculated projective transformation matrix to the image processing section 430. The image processing section 430 performs image correction on the input image data $Image^{n-1}$ of the n−1-th frame using the input image data $Image^{n-1}$ of the n−1-th frame output from the memory unit 500 and the projective transformation matrix $H^{b2(n-1)}$ from the b-th frame to the n−1-th frame.

By the configurations described above, the input image data of a plurality of frames can be processed in parallel, and the efficiency of the processing by the image processing apparatus 10 can be increased.

Figure 13:
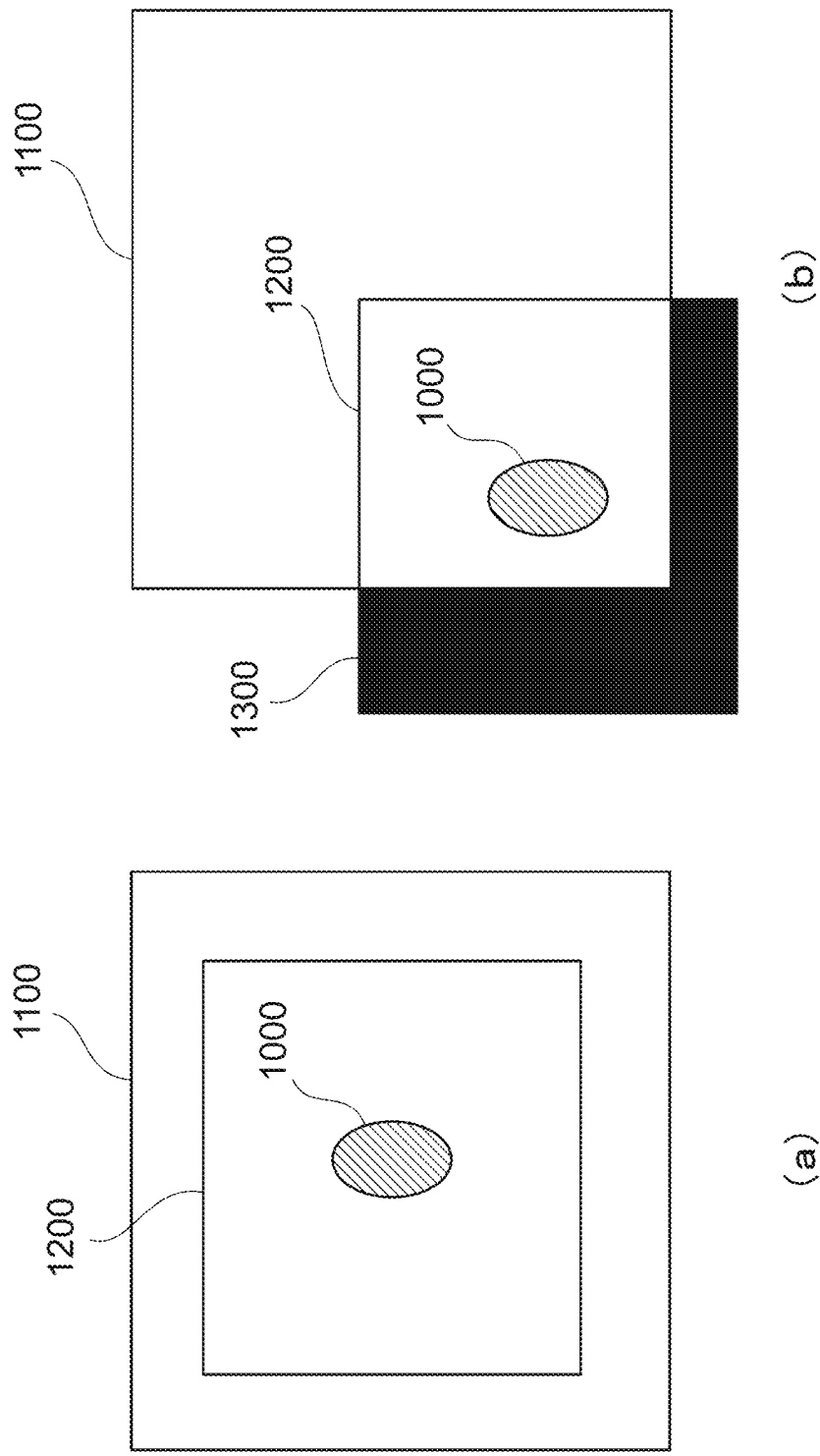
FIG. 13 is a conceptual diagram of a case in which a black area occurs due to image processing by the image processing apparatus 10.

Meanwhile, when the image processing apparatus 10 performs image processing, an undefined region, that is, a black area will occur in a part of output image data after the image processing if the global motion or the local motion of a compensated target is large. FIG. 13 shows conceptual diagrams of a case in which a black area occurs due to image processing by the image processing apparatus 10. FIG. 13(a) shows the relationship between a specific object 1000, a capturing range 1100, and an output range 1200 of output image data in a certain reference frame (the b-th frame). FIG. 13(b) shows the relationship between the specific object 1000, the capturing range 1100, the output range 1200 of the output image data, and a black area 1300 in a frame (the n-th frame) after the reference frame. In the n-th frame, a position on a screen of the specific object 1000 has moved due to the occurrence of global motion or local motion or the occurrence of both the global motion and the local motion from the b-th frame. In this case, although the image processing by the image processing apparatus 10 makes correction such that the specific object 1000 is, for example, positioned at the center of the output image data, the black area 1300 is included in the output range 1200 of the output image data as a result.

Accordingly, in order to solve such a problem, a physical operation adjustment apparatus may be used in combination with the image processing apparatus 10 in the image processing system. For example, a camera operation adjustment apparatus that adjusts the operation of a camera on the basis of global motion or local motion may be used, or an object position adjustment apparatus that adjusts the position of an object on the basis of global motion or local motion may be used.

Figure 14:
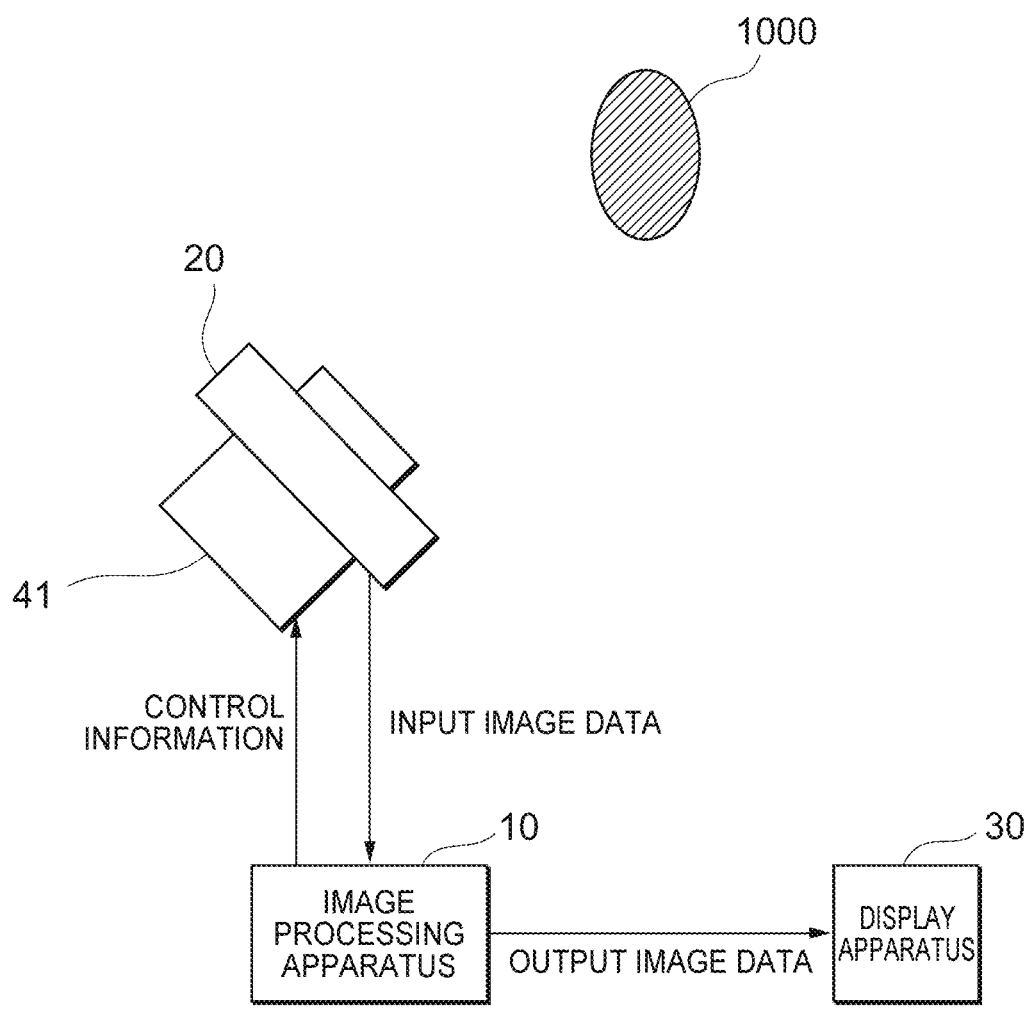
FIG. 14 is a conceptual diagram of the image processing system 1 combined with a camera operation adjustment apparatus.

FIG. 14 is a conceptual diagram of the image processing system 1 combined with a camera operation adjustment apparatus. An actuator 41 for camera operation adjustment is attached to the shooting camera 20. The image processing apparatus 10 estimates global motion or local motion or both the global motion and the local motion on the basis of input image data received from the shooting camera 20 that shoots the specific object 1000, and transmits control information calculated on the basis of the estimated global motion or the estimated local motion or both the estimated global motion and the estimated local motion to the actuator 41. The actuator 41 adjusts the operation (that includes but not limited to, for example, a change in direction or inclination and horizontal or vertical movement) of the shooting camera on the basis of the received control information.

Figure 15:
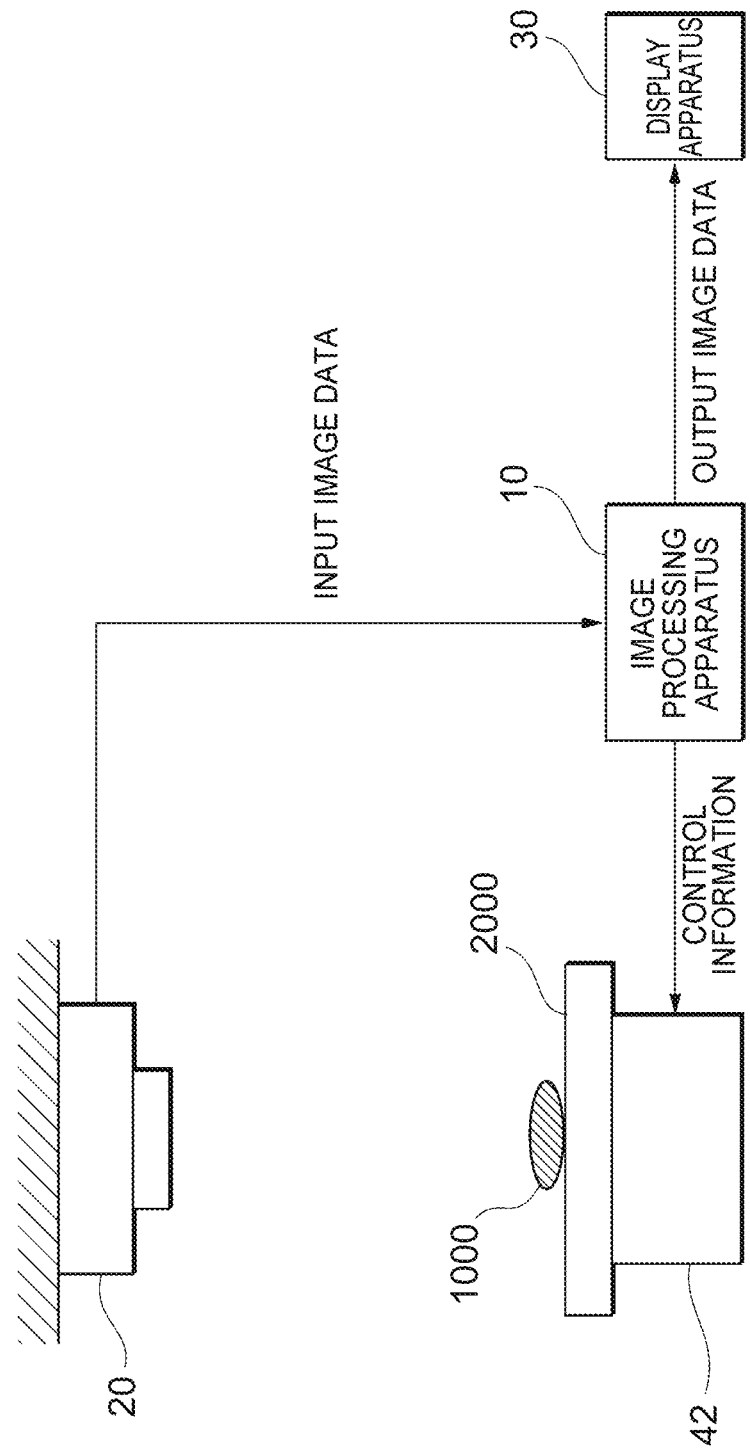
FIG. 15 is a conceptual diagram of the image processing system 1 combined with an object position adjustment apparatus.

Further, FIG. 15 is a conceptual diagram of the image processing system 1 combined with an object position adjustment apparatus. The specific object 1000 is placed on a shooting stage 2000, and an actuator 42 for object position adjustment is attached to the shooting stage 2000. The image processing apparatus 10 estimates global motion or local motion or both the global motion and the local motion on the basis of input image data received from the shooting camera 20 that shoots the specific object 1000, and transmits control information calculated on the basis of the estimated global motion or the local motion or both the estimated global motion and the local motion to the actuator 42 for object position adjustment. The actuator 42 adjusts the position of the shooting stage 2000 on the basis of the received control information.

In FIG. 15, the shooting camera 20 is, for example, a microscope, and the specific object 1000 is, for example, a moving object such as a microorganism. Even if the specific object 1000 moves, the actuator 42 adjusts the position of the shooting stage 2000 such that a desired region including the specific object 1000 is positioned within the visual field of the microscope.

Next, an application example of the image processing system 1 in the above embodiments will be described.

Figure 16:
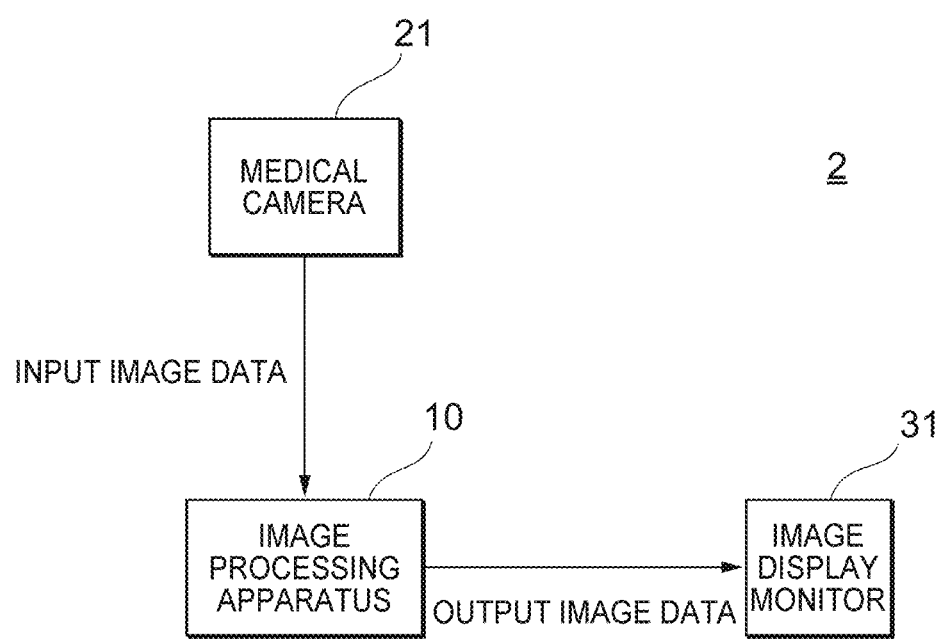
FIG. 16 is a conceptual diagram of a medical video processing system 2 to which the image processing apparatus 10 is applied.

FIG. 16 is a conceptual diagram of a medical video processing system 2 to which the image processing apparatus 10 is applied. The medical video processing system 2 includes the image processing apparatus 10, a medical camera 21, and an image display monitor 31. Here, the medical camera 21 is, for example, an endoscope camera, a surgery recording camera mounted in a ceiling, a medical microscope, or the like. The image processing apparatus 10 processes input image data input from the medical camera 21 and outputs the processed data to the image display monitor 31. The image display monitor 31 outputs video or the like required by doctors to perform medical care such as surgery.

Note that the embodiments described above aim to facilitate the understanding of the present invention and do not aim to limitedly interpret the present invention. The present invention can be changed and improved without departing from its spirit and include its equivalents. That is, those obtained when persons skilled in the art make appropriate design changes to the respective embodiments are also included in the scope of the present invention so long as they include the features of the present invention. For example, the respective elements of the respective embodiments and their arrangements, materials, conditions, shapes, sizes, or the like are not limited to the illustrated ones but can be appropriately changed. Further, the respective embodiments are given for illustration. It is possible to partially replace or combine the configurations shown in the different embodiments together as a matter of course, and such replacements or combinations are included in the scope of the present invention so long as they include the features of the present invention.

REFERENCE SIGNS LIST

1 Image processing system
2 Medical image processing system
10 Image processing apparatus
20 Shooting camera
21 Medical camera
30 Display apparatus
31 Image display monitor
41 Actuator for camera operation adjustment
42 Actuator for object position adjustment
100 Image reduction unit
200 Global motion estimation unit
210 Brightness image generation section
220 Corresponding point detection section 230 Corresponding point selection section
300 Local motion estimation unit
310 Region extraction section
320 Centroid calculation section
330 Movement amount calculation section
400 Image correction unit
410 Reading section
420 Projective transformation matrix calculation section
430 Image processing section
500, 600 Memory unit
1000 Specific object
1100 Capturing range
1200 Output range of output image data
1300 Black area
2000 Shooting stage
[FIG. 1]
10 IMAGE PROCESSING APPARATUS
20 SHOOTING CAMERA
30 DISPLAY APPARATUS
  INPUT IMAGE DATA
  OUTPUT IMAGE DATA
[FIG. 2]
10 IMAGE PROCESSING APPARATUS
100 IMAGE REDUCTION UNIT
200 GLOBAL MOTION ESTIMATION UNIT
300 LOCAL MOTION ESTIMATION UNIT
400 IMAGE CORRECTION UNIT
  INPUT IMAGE DATA
  OUTPUT IMAGE DATA
[FIG. 3]
  CAMERA
  MOTION
[FIG. 4]
(a)
  IMAGE MOTION DUE TO CAMERA
(b)
  GLOBAL/LOCAL MOTION
  VANISHING POINT
[FIG. 5]
200 GLOBAL MOTION ESTIMATION UNIT
210 BRIGHTNESS IMAGE GENERATION SECTION
220 CORRESPONDING POINT DETECTION SECTION
230 CORRESPONDING POINT SELECTION SECTION
  INPUT DATA
  OUTPUT
[FIG. 6]
  DURING DETECTION OF M POINTS
  POINT SEQUENCE IN IMAGE OF n−1-TH FRAME
  POINT SEQUENCE IN IMAGE OF n-TH FRAME
[FIG. 7]
  DURING DETECTION OF M POINTS
  POINT SEQUENCE IN IMAGE OF n−1-TH FRAME
  POINT SEQUENCE IN IMAGE OF n-TH FRAME
  SELECT PREFERRED POINTS (FOUR POINTS)
  FOUR POINTS IN IMAGE OF n−1-TH FRAME (PREVIOUS)
  FOUR POINTS IN IMAGE OF n-TH FRAME (PRESENT)
[FIG. 8]
(a)
  CONTOUR OF SPECIFIC OBJECT
(b)
  CENTROID POINT OF SPECIFIC OBJECT
[FIG. 9]
300 LOCAL MOTION ESTIMATION UNIT
310 REGION EXTRACTION SECTION
320 CENTROID CALCULATION SECTION
330 MOVEMENT AMOUNT CALCULATION SECTION
  INPUT DATA
  OUTPUT
[FIG. 10]
400 IMAGE CORRECTION UNIT
410 READING SECTION
420 PROJECTIVE TRANSFORMATION MATRIX CALCULATION SECTION
430 IMAGE PROCESSING SECTION
  CORRESPONDING POINT INFORMATION ON GLOBAL MOTION
  MOVEMENT AMOUNT VECTOR INFORMATION ON LOCAL MOTION
  OUTPUT
[FIG. 11]
  CHANGE IN CAMERA AXIS
[FIG. 12]
10 IMAGE PROCESSING APPARATUS
100 IMAGE REDUCTION UNIT
200 GLOBAL MOTION ESTIMATION UNIT
300 LOCAL MOTION ESTIMATION UNIT
400 IMAGE CORRECTION UNIT
410 READING SECTION
420 PROJECTIVE TRANSFORMATION MATRIX CALCULATION SECTION
430 IMAGE PROCESSING SECTION
500, 600 MEMORY UNIT
  INPUT IMAGE DATA
  CORRESPONDING POINT INFORMATION ON GLOBAL MOTION
  MOVEMENT AMOUNT VECTOR INFORMATION ON LOCAL MOTION
  OUTPUT
[FIG. 14]
10 IMAGE PROCESSING APPARATUS
30 DISPLAY APPARATUS
  CONTROL INFORMATION
  INPUT IMAGE DATA
  OUTPUT IMAGE DATA
[FIG. 15]
10 IMAGE PROCESSING APPARATUS
30 DISPLAY APPARATUS
  INPUT IMAGE DATA
  CONTROL INFORMATION
  OUTPUT IMAGE DATA
[FIG. 16]
10 IMAGE PROCESSING APPARATUS
21 MEDICAL CAMERA
31 IMAGE DISPLAY MONITOR
  INPUT IMAGE DATA
  OUTPUT IMAGE DATA

What is claimed is:

1. An image processing apparatus comprising:
global motion estimation means for estimating global motion indicating motion of a specific region containing a specific object in a moving picture from a plurality of frame images contained in the moving picture, wherein the global motion is caused by movement of a device used to capture the moving picture;
local motion estimation means for estimating local motion indicating motion of the specific object in the moving picture from the plurality of frame images; and
image correction means for correcting the motion of the specific object or the specific region in the moving picture on a basis of the estimated global motion and the local motion, wherein the image correction means generates a projective transformation matrix corresponding to the estimated global motion, corrects the projective transformation matrix on a basis of the estimated local motion, and corrects the motion of the specific object or the specific region in the moving picture on a basis of the corrected projective transformation matrix.

2. The image processing apparatus according to claim 1, wherein
the local motion estimation means estimates local motion by using a movement amount of a specific point in a region containing the specific object.

3. The image processing apparatus according to claim 2, wherein the specific point is a centroid of the object.

4. The image processing apparatus according to claim 1, wherein
the global motion estimation means and the local motion estimation means estimate global motion and local motion by using an image obtained by reducing an input image.

5. A non-transitory computer-readable medium storing computer-executable instructions, that when executed by one or more processors, cause the one or more processors to perform global motion estimation for estimating global motion indicating motion of a specific region containing a specific object in a moving picture from a plurality of frame images contained in a moving picture, wherein the global motion is caused by movement of a device used to capture the moving picture;
perform local motion estimation for estimating local motion indicating motion of the specific object in the moving picture from the plurality of frame images; and
perform image correction for generating a projective transformation matrix corresponding to the estimated global motion, correcting the projective transformation matrix on a basis of the estimated local motion, and correcting the motion of the specific object or the specific region in the moving picture on a basis of the corrected projective transformation matrix.

6. A method of image processing comprising:
performing global motion estimation for estimating global motion indicating motion of a specific region containing a specific object in a moving picture from a plurality of frame images contained in a moving picture, wherein the global motion is caused by movement of a device used to capture the moving picture;
performing local motion estimation for estimating local motion indicating motion of the specific object in the moving picture from the plurality of frame images; and
performing image correction for generating a projective transformation matrix corresponding to the estimated global motion, correcting the projective transformation matrix on a basis of the estimated local motion, and correcting the motion of the specific object or the specific region in the moving picture on a basis of the corrected projective transformation matrix.

7. An image processing system having a shooting camera for shooting a moving picture, an image processing apparatus configured to process an image of the moving picture, and a display apparatus configured to display the processed image of the moving picture, the image processing apparatus comprising:
global motion estimation means for estimating global motion indicating motion of a specific region containing a specific object in the moving picture from a plurality of frame images contained in the moving picture, wherein the global motion is caused by movement of the shooting camera;
local motion estimation means for estimating local motion indicating motion of the specific object in the moving picture from the plurality of frame images; and
image correction means for correcting the motion of the specific object or the specific region in the moving picture on a basis of the estimated global motion and the local motion, wherein the image correction means generates a projective transformation matrix corresponding to the estimated global motion, corrects the projective transformation matrix on a basis of the estimated local motion, and corrects the motion of the specific object or the specific region in the moving picture on a basis of the corrected projective transformation matrix.

8. The image processing system according to claim 7 having a camera operation adjustment apparatus configured to adjust an operation of the shooting camera on a basis of estimated global motion or estimated local motion or both the estimated global motion and the estimated local motion.

9. The image processing system according to claim 8, having an object position adjustment apparatus configured to adjust a position of the specific object on a basis of estimated global motion or estimated local motion or both the estimated global motion and the estimated local motion.

* * * * *